(12) United States Patent
Takimasa et al.

(10) Patent No.: US 8,111,407 B2
(45) Date of Patent: Feb. 7, 2012

(54) DISPLACEMENT SENSOR

(75) Inventors: Hiroaki Takimasa, Ayabe (JP);
Takahiro Suga, Fukuchiyama (JP);
Yoshihiro Yamashita, Fukuchiyama (JP)

(73) Assignee: Omron Corporation, Kyoto (JP)

( * ) Notice: Subject to any disclaimer, the term of this patent is extended or adjusted under 35 U.S.C. 154(b) by 140 days.

(21) Appl. No.: 12/712,012

(22) Filed: Feb. 24, 2010

(65) Prior Publication Data
US 2010/0265519 A1 Oct. 21, 2010

(30) Foreign Application Priority Data
Mar. 13, 2009 (JP) ................................. 2009-061740

(51) Int. Cl.
*G01N 21/00* (2006.01)
(52) U.S. Cl. ....................................... 356/614; 356/624
(58) Field of Classification Search ........... 356/614–624
See application file for complete search history.

(56) References Cited

U.S. PATENT DOCUMENTS

| | | | |
|---|---|---|---|
| 6,370,406 B1 * | 4/2002 | Wach et al. | 600/310 |
| 6,416,234 B1 * | 7/2002 | Wach et al. | 385/70 |
| 6,429,897 B2 * | 8/2002 | Derndinger et al. | 348/295 |

FOREIGN PATENT DOCUMENTS

| | | |
|---|---|---|
| JP | 2003-083723 | 3/2003 |
| JP | 2004-286598 | 10/2004 |
| JP | 2008-128744 A | 6/2008 |

OTHER PUBLICATIONS

German Patent and Trademark Office action on application No. 10 2010 000 468.5 dated Jun. 8, 2011; 6 pages.

* cited by examiner

*Primary Examiner* — Michael P Stafira
(74) *Attorney, Agent, or Firm* — Foley & Lardner LLP

(57) ABSTRACT

A displacement is accurately measured at high speed to a measurement object having various surface states. In a displacement sensor including a confocal optical system in which an objective lens is moved along an optical axis, light emitted from a laser diode is formed into a slit beam by a cylindrical lens, a Y-axis side orthogonal to the optical axis is narrowed such that the light is collected on a surface of a measurement object, and an X-axis orthogonal to the optical axis is elongated in order to average a component of the light reflected from the surface. A photodiode receives the light reflected from the surface of the measurement object through an opening disposed in a position of conjugation with the laser diode. The opening is formed into a slit shape that is short in the Y-axis while being long in the X-axis. The displacement of the surface is measured from a position of the objective lens when a light receiving signal becomes the maximum.

7 Claims, 16 Drawing Sheets

POSITION (1)

POSITION (2)

POSITION (3)

WHEN WORKPIECE IS MIRROR SURFACE

POSITION (4)

POSITION (5)

WHEN WORKPIECE IS SCATTERING SURFACE

POSITION (4)

POSITION (5)

POSITION (3)

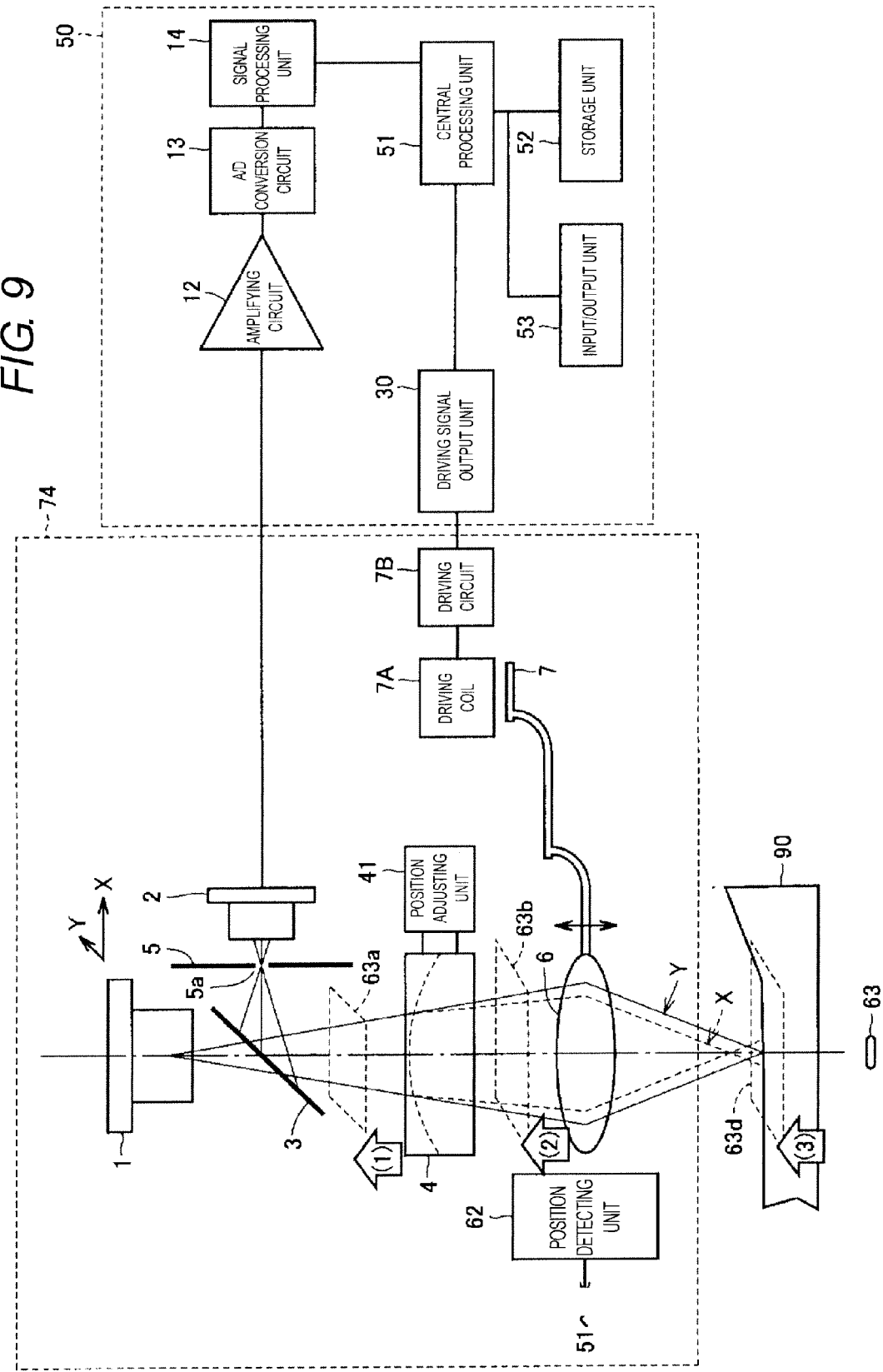

POSITION (1)

POSITION (2)

POSITION (3)

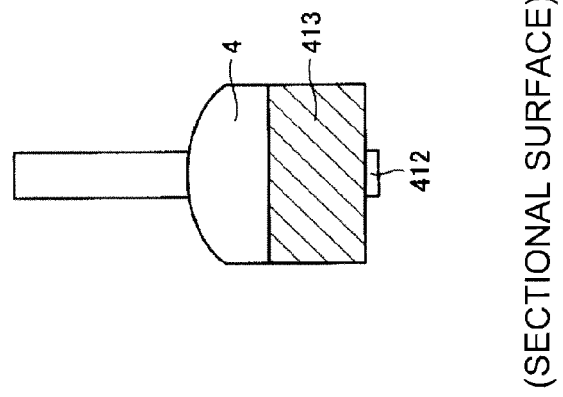
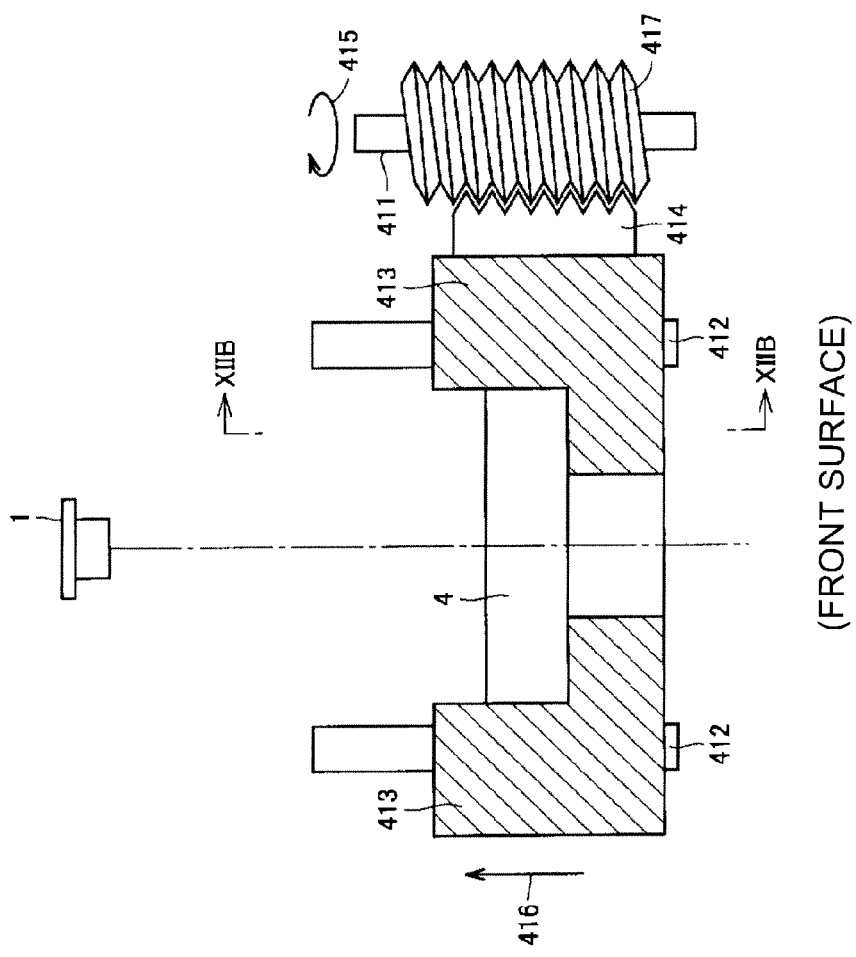

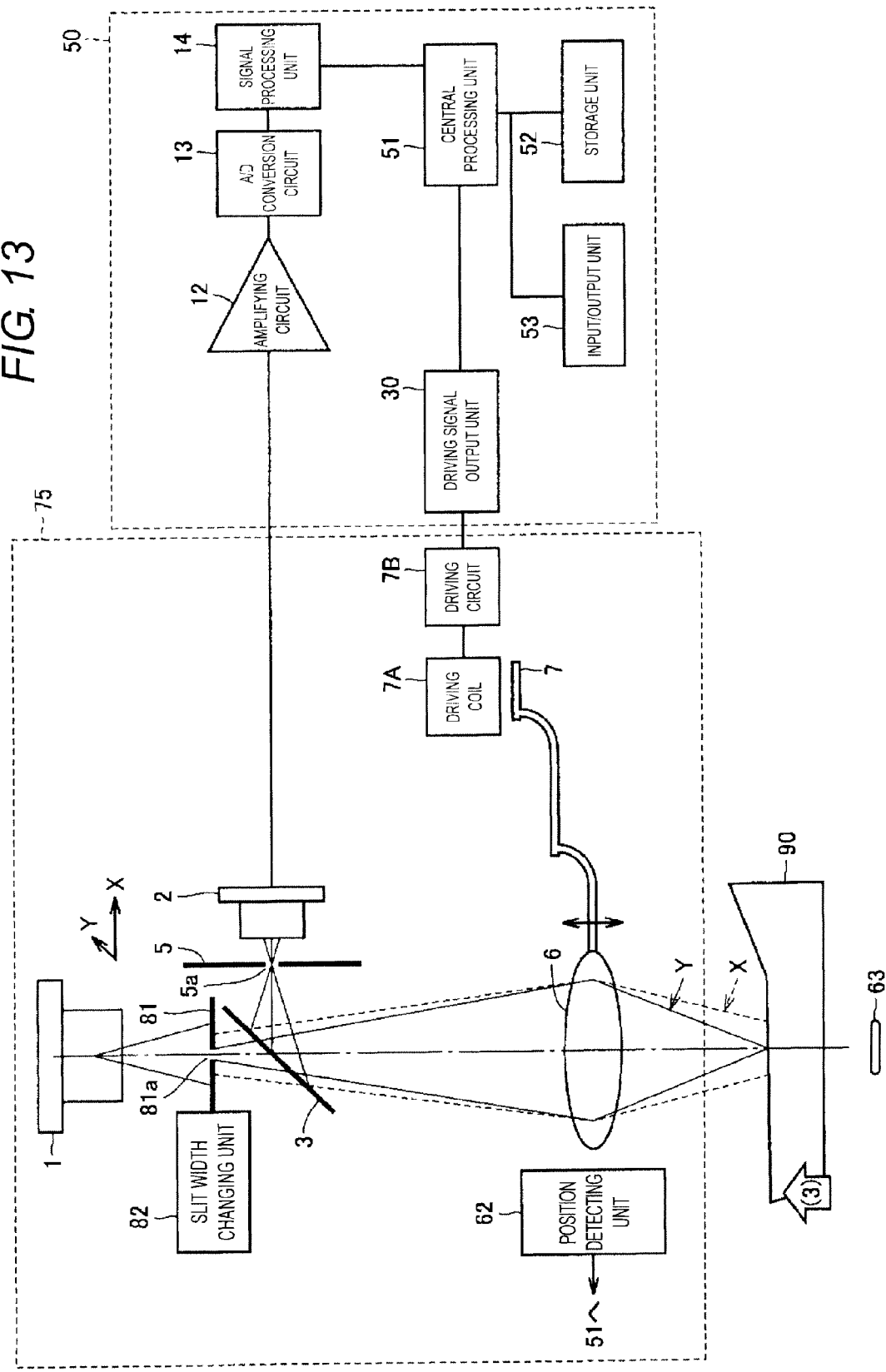

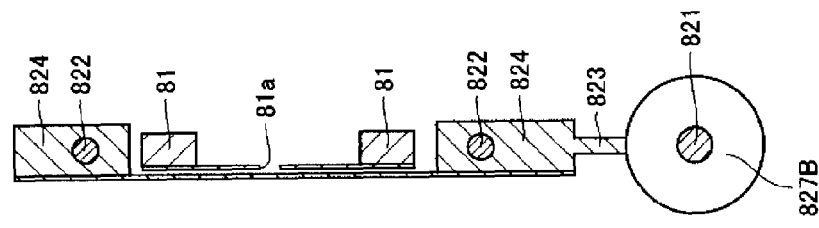
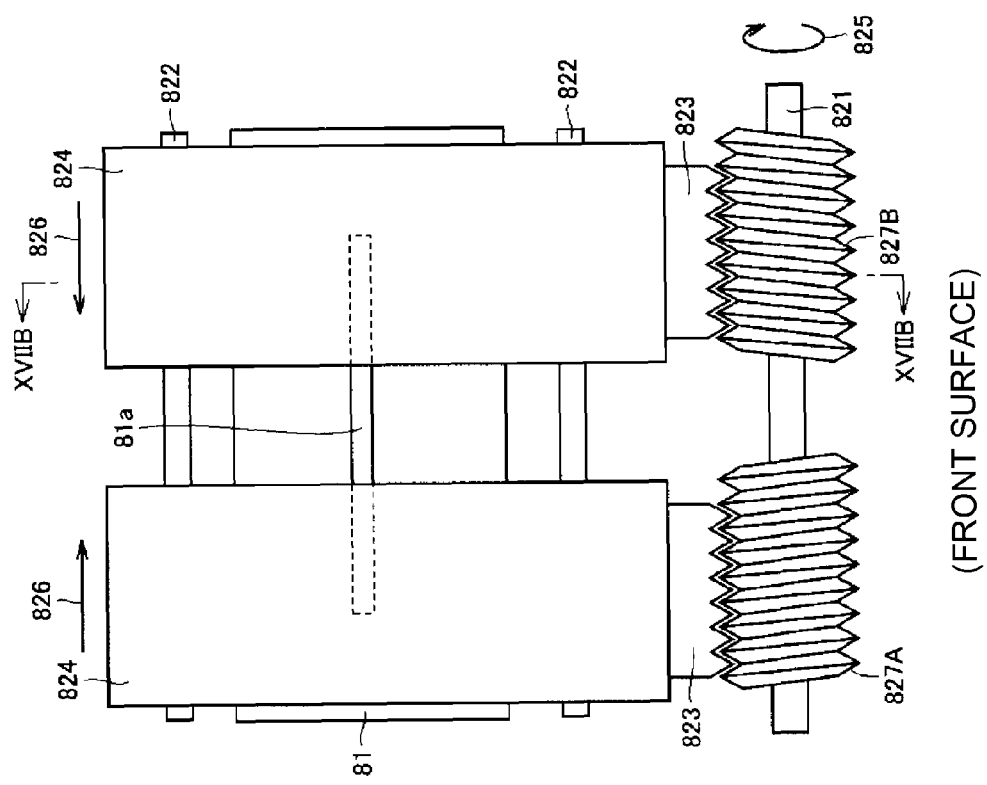

DISPLACEMENT SENSOR

This application is based on Japanese Patent Application No. 2009-061740 filed with the Japanese Patent Office on Mar. 13, 2009, the entire content of which is hereby incorporated by reference.

BACKGROUND OF THE INVENTION

1. Technical Field

The present invention relates to a displacement sensor with a confocal optical system that measures a displacement of an object in a noncontact manner.

2. Related Art

In the displacement sensor with the confocal optical system, a surface of a measurement object is illuminated with a laser beam, light reflected from the surface is received, and the displacement of the surface of the measurement object is measured based on a received light quantity level. At this point, the surface of the measurement object is illuminated with the laser beam whose coherent is kept at a high level, even if the laser beam passes through the optical system. Therefore, a measurement error is generated by a surface state of the measurement object. Specifically, when the surface of the measurement object is illuminated with the laser beam, pieces of light having different phases are reflected from the surface of the measurement object. The pieces of reflected light interfere with each other to be enhanced or cancelled, which affects the received light quantity. A spotted pattern corresponding to the surface state (degree of irregularity) of the measurement object is called a "speckle".

The confocal optical system is utilized in the displacement sensor in which the laser beam is used. In the confocal optical system, because of a small spot size of the laser beam with which the surface state of the measurement object is illuminated, the high-contrast, large-size speckle is included in the light reflected from the surface of the measurement object. Accordingly, a speckle component included in a light receiving signal becomes a noise to increase the measurement error. In order to eliminate the measurement error, for example, Japanese Unexamined Patent Publication No. 2004-286598 discloses a displacement meter with the confocal optical system, in which displacement amounts in plural positions are continuously measured while a laser beam illumination position changes in the measurement object surface, thereby averaging the influence of the speckle.

In the displacement meter of Japanese Unexamined Patent Publication No. 2004-286598, although the measurement error caused by the influence of the speckle can be decreased, it is necessary that the displacement amounts in plural positions be continuously measured while the measuring point (laser beam spot position in measurement object surface) changes. Therefore, it takes a lot of time to perform the measurement.

In order to solve the problem, for example, Japanese Unexamined Patent Publication No. 2003-83723 discloses a three-dimensional shape measurement optical system in which the confocal optical system is used. In the three-dimensional shape measurement optical system of Japanese Unexamined Patent Publication No. 2003-83723, the measurement object is illuminated with a line beam while a lens position of the objective optical system changes instead of changing the laser beam spot position in the displacement meter of Japanese Unexamined Patent Publication No. 2004-286598. The light reflected from the measurement object surface is received by a line sensor, and three-dimensional shape measurement is performed based on a received light level. In the three-dimensional shape measurement optical system of Japanese Unexamined Patent Publication No. 2003-83723, it is not necessary to change the laser beam spot position in the measurement object surface. Therefore, the three-dimensional shape measurement optical system eliminates the problem of Japanese Unexamined Patent Publication No. 2004-286598 in that a long time is required to perform the measurement.

However, even in the three-dimensional shape measurement optical system of Japanese Unexamined Patent Publication No. 2003-83723, because the reflected light component includes speckle according to a surface state of the measurement object, the displacement is hardly measured with high accuracy. That is, on a short axis side of the substantially rectangular line beam with which the measurement object surface is illuminated, the speckle is generated in the reflected light like a focal distance of the spot of Japanese Unexamined Patent Publication No. 2004-286598. Because the line sensor receives the light on a long axis side, a variation in receive light quantity is generated in each pixel by the speckle. Accordingly, in the three-dimensional shape measurement optical system of Japanese Unexamined Patent Publication No. 2003-83723, a relatively wide area in the measurement object surface is illuminated with the substantially rectangular line beam. However, because the reflected light component incident to each pixel includes the speckle noise, a real detection value is hardly obtained even if displacement measured values corresponding to the pixels of the line sensor is averaged.

Additionally, in reading a signal from the line sensor, it is necessary to keep a lens position of an objective optical system constant in order to project the line beam onto the measurement object surface. Therefore, a high-speed response is hardly performed.

In the three-dimensional shape measurement optical system of Japanese Unexamined Patent Publication No. 2003-83723, it is necessary that a slit used to form a line beam and the line sensor be conjugatively disposed in order to obtain a confocal effect. Accordingly, because the precise positioning is required, the three-dimensional shape measurement optical system of Japanese Unexamined Patent Publication No. 2003-83723 is hardly assembled and adjusted.

SUMMARY

The present invention has been devised to solve the problems described above, and an object thereof is to provide a displacement sensor that can accurately measure the displacement at high speed to the measurement object having various surface states.

In accordance with one aspect of the present invention, a displacement sensor includes a light source that emits light; a light projecting unit that projects the light emitted from the light source toward a measurement object to illuminate the measurement object with the light while continuously changing a light collecting position along an optical axis direction of the light to be collected; a light collecting unit that guides reflected light of the light with which the measurement object is illuminated in an opposite direction to an optical path of the illumination light of the light projecting unit; an optical path separating element that separates an optical path of the reflected light in the light collecting unit from the optical path of the light projecting unit; a first opening portion that includes a first light shielding member constituting a first opening, the first light shielding member shielding at least part of the reflected light separated from the optical path of the light projecting unit by the optical path separating element while the first opening passes other parts of the reflected light; a light receiving unit that receives the reflected light passed through the first opening portion and supplies a light receiving signal according to a received light quantity; and a processing unit that obtains information on a distance to the measurement object based on the light receiving signal.

In the displacement sensor, the light collecting unit includes a spot diameter changing unit that outputs the light to the measurement object while changing a diameter in a direction, in which a first axis orthogonal to the optical axis extends, shorter than a diameter in a direction, in which a second axis orthogonal to the optical axis extends, of a spot in the light collecting position on the measurement object, the spot on the measurement object is focused in the direction in which the first axis extends, the first opening having a substantially rectangular shape is disposed in a position of conjugation with the light source in the direction in which the first axis extends, and a side in the direction in which the first axis extends of the substantially rectangular shape is shorter than a side in the direction in which the second axis extends.

In the displacement sensor according to the aspect of the present invention, the measurement object surface is illuminated with the substantially rectangular spot, the spot is focused in the direction in which the first axis extends, and the light reflected from the spot is received by the light receiving unit through the first opening. The first opening has the substantially rectangular shape, and the first opening is disposed in the position of conjugation with the direction in which the first axis extends. In the first opening, the side in the direction in which the first axis extends, of the substantially rectangular shape, is shorter than the side in the direction in which the second axis extends. Accordingly, the focused state can be detected in the direction in which the first axis extends while the influence of the speckle generated in the reflected light according to the surface state of the measurement object is averaged in the direction in which the second axis extends, and the displacement can accurately be measured based on the light receiving signal in the focused state.

"The light projecting unit continuously changes the light collecting position" means that the light collecting position changes according to a previously determined mode, and "the light projecting unit continuously changes the light collecting position" includes the case in which the light collecting positions change at predetermined different speeds in addition to the case in which the light collecting position changes at a constant speed. Because the optical component that collects the light is moved at a constant speed or in a constant oscillation period, "the light projecting unit continuously changes the light collecting position" includes the case in which the light collecting positions change at predetermined different speeds. The change includes the case in which the light collecting position changes unidirectionally within a predetermined range, the case in which the light collecting position changes in a reciprocating manner, the case in which the light collecting position changes singly, and the case in which the change of the light collecting position is periodically repeated.

The light collecting unit may include an optical component group such as plural lenses and plural mirrors, in which the whole or part of the optical component group is moved, and the light collecting unit may include a single moving lens and a single moving mirror.

The optical path separating element includes a half mirror and a polarization beam splitter. Preferably the spot diameter changing unit includes an optical lens whose principal axis is matched with the optical axis and, in the optical lens, a focal distance in the direction in which the first axis extends differs from a focal distance in the direction in which the second axis extends.

Preferably the optical lens is movable along the direction in which optical axis extends. Therefore, the optical lens is moved according to the surface state of the measurement object, and the substantially rectangular shape of the spot collected on the surface becomes variable, so that the high-accuracy measurement can quickly be performed while the necessary in-plane resolution is maintained.

Preferably the optical lens is a cylindrical lens. Preferably the optical lens is a toric lens.

Preferably, the spot diameter changing unit includes a second light shielding member constituting a second opening, the second light shielding member shields at least part of the illumination light, the second opening includes a second opening portion that passes other parts of the illumination light, the second opening has a rectangular shape, and a side in the direction in which the first axis extends of the rectangular is shorter than a side in the direction in which the second axis extends.

The first and second openings are regions in a space that passes the light, and the first and second openings include a pin-hole and a slit. "The opening is formed" means that the region in the space that passes the light is restricted by disposing the first and second light shielding members.

Preferably a length of a side is variable in a direction in which the second axis of the second opening extends. Therefore, the substantially rectangular shape of the spot collected on the surface becomes variable by changing the length of the side in the direction in which the second axis of the second opening extends according to the surface state of the measurement object, so that the high-accuracy measurement can quickly be performed while the necessary in-plane resolution is maintained in the first axis direction.

According to the present invention, the focused state can be detected in the direction in which the first axis extends while the influence of the speckle generated in the light reflected from the measurement object surface according to the surface state is averaged in the direction in which the second axis extends, and the displacement can accurately be measured based on the light receiving signal in the focused state. Additionally, the displacement can accurately be measured as an average height value of the measurement object having the irregular surface.

Further, the substantially rectangular shape of the spot collected on the surface becomes variable according to the surface state of the measurement object, so that the high-accuracy measurement can quickly be performed while the necessary in-plane resolution is maintained.

BRIEF DESCRIPTION OF THE DRAWINGS

FIG. 9 schematically illustrates an entire configuration of a displacement sensor according to a fourth embodiment of the present invention;

FIGS. 12A and 12B illustrate a mechanism that vertically moves the cylindrical lens of FIG. 9;

FIG. 13 schematically illustrates an entire configuration of a displacement sensor according to a fifth embodiment of the present invention;

FIGS. 17A and 17B illustrate a mechanism that enlarges/reduces the slit width of FIG. 13.

DETAILED DESCRIPTION

Figure 1:
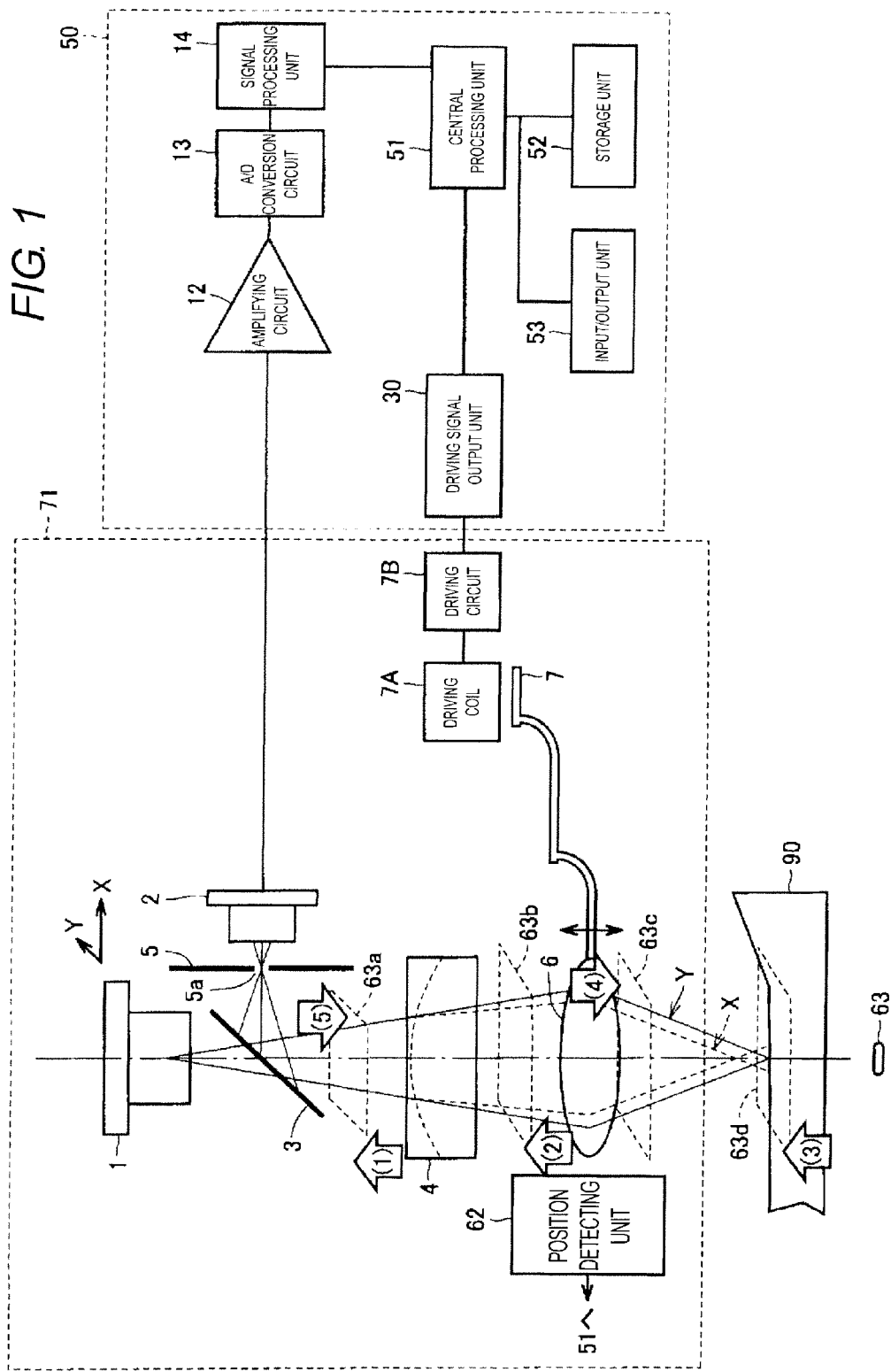
FIG. 1 schematically illustrates an entire configuration of a displacement sensor according to a first embodiment of the present invention.

Hereinafter, preferred embodiments of the present invention will be described with reference to the drawings. In the drawings, the same component is designated by the same numeral, and the overlapping description is omitted.

A displacement sensor of each embodiment includes a confocal optical system. It is assumed that a Z-axis is an optical axis of the confocal optical system, and it is assumed that an X-axis and a Y-axis are orthogonal to the Z-axis. A direction in which the X-axis extends is referred to as "X-direction", and a direction in which the Y-axis extends is referred to as "Y-direction". The confocal optical system of each embodiment is designed to become confocal only in the Y-direction.

A laser diode 1 that is of a light source and an opening (opening 5a) that leads the light to a light receiving unit (photodiode 2) are conjugatively disposed in the confocal optical system of each embodiment. "The laser diode 1 and the opening are conjugatively disposed" shall mean that, when illumination light emitted from the light source is focused on a surface of a measurement object 90, the light source, the opening, and the light receiving unit are designed to be disposed such that the light reflected form the surface of the measurement object 90 is simultaneously focused on the light receiving unit.

First Embodiment

Referring to FIG. 1, a displacement sensor according to a first embodiment of the present invention with a confocal optical system includes a sensor head 71 and a controller 50 that controls the sensor head 71.

In the sensor head 71, the laser diode 1 that is of the light source emits the light having constant intensity in a direction in which an optical axis of an alternate long and short dash line extends. The light is led to an objective lens 6 through a cylindrical lens 4 constituting part of a light collecting unit that collects the light to the measurement object 90. Then the light is collected onto the surface of the measurement object 90 through the objective lens 6. The objective lens 6 is supported by an oscillator 7. A driving coil 7A is disposed near the oscillator 7 in order to drive the oscillator 7. A driving circuit 7B is provided in the sensor head 71 in order to feed electric power to the driving coil 7A. An interval at which a current is passed through the driving coil 7A and an interval at which supply of the current is stopped are alternately repeated in a constant period, thereby periodically oscillating the oscillator 7 in arrow direction of FIG. 1. The objective lens 6 is moved in directions in which the objective lens 6 comes close to and recedes from the measurement object 90 in conjunction with the oscillation of the oscillator 7. A driving signal output unit 30 controls a conduction mode of the driving circuit 7B to the driving coil 7A. In the first embodiment, the objective lens 6 and the oscillator 7, the driving coil 7A, and the driving circuit 7B, which move the objective lens 6, constitute part of the light collecting unit. The sensor head 71 also includes a position detecting unit 62 in order to detect a position of the objective lens 6. The position detecting unit 62 supplies a detection signal to a central processing unit 51. That is, the position detecting unit 62 supplies an output to the central processing unit 51 as a lens position signal indicating a lens position of the objective lens 6.

The laser beam emitted toward the measurement object 90 is reflected from the surface of the measurement object 90. The reflected light is collected toward an opening (diaphragm hole) 5a previously made in a diaphragm plate 5 through the objective lens 6, the cylindrical lens 4, and a half mirror 3, and the light passing through the opening (diaphragm hole) 5a is received by the photodiode 2. In the first embodiment, the half mirror 3 may be replaced with a polarization beam splitter. The half mirror 3 or the polarization beam splitter constitutes an optical path separating element, and the photodiode 2 constitutes the light receiving unit. The photodiode 2 supplies a light receiving signal to the controller 50.

In the controller 50, after an amplifying circuit 12 amplifies the light receiving signal, an A/D (Analog/Digital) conversion circuit 13 converts the light receiving signal into a digital signal, and a signal processing unit 14 performs appropriate processing to supply the digital signal to a central processing unit 51. The central processing unit 51 controls an entire operation of the controller 50 while performing the processing. The central processing unit 51 obtains a setting value fed from the outside through an input/output unit 53, the central processing unit 51 stores the setting value in a storage unit 52, and the central processing unit 51 displays processing result on the input/output unit 53 or supplies the processing result to the outside. In the first embodiment, the central processing unit 51 constitutes a processing unit.

The central processing unit 51 measures a displacement using the light receiving signal and the lens position signal from the position detecting unit 62. Specifically, in the confocal optical system, when the surface of the measurement object 90 is matched with the position in which the light is collected by the objective lens 6, the light reflected on the measurement object 90 is collected in the position of the opening 5a through the optical system. At this point, the maximum (peak) emerges periodically in the light receiving signal according to the position of the objective lens 6. In the first embodiment, for example, a conversion table indicating a relationship between the lens position signal and a distance from an end portion of the sensor head 71 to the position in which the light is collected toward the measurement object 90 is previously generated and stored in the storage unit 52. During the operation, the central processing unit 51 searches the conversion table to read the correlated distance based on the position of the objective lens 6 when the peak emerges in the light receiving signal, thereby detecting the distance to the measurement object 90 existing in the light collecting position.

In FIG. 1, the feature of the cylindrical lens 4 is that the X-direction differs from the Y-direction in a focal distance. Additionally, as described above, the confocal optical system of FIG. 1 is designed to become confocal only in the Y-direction. In consideration of these features, a light collecting state observed at positions (1) to (5) of virtual planes 63a to 63d in the optical system of FIG. 1 will be described with reference to FIGS. 2 to 4.

Figure 2A:
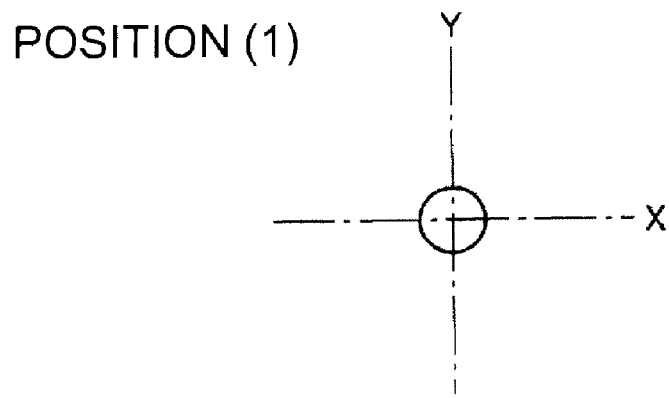
FIGS. 2A to 2C illustrate a light collecting state of FIG. 1.

In FIG. 1, at the position (1) in a lower direction (direction in which the surface of the measurement object 90 is located) of the virtual plane 63a, when the light is observed before the light emitted from the laser diode 1 is incident to the cylindrical lens 4, a spot diameter of the light in the X-direction is substantially equal to that in the Y-direction as illustrated in FIG. 2A.

Figure 2B:
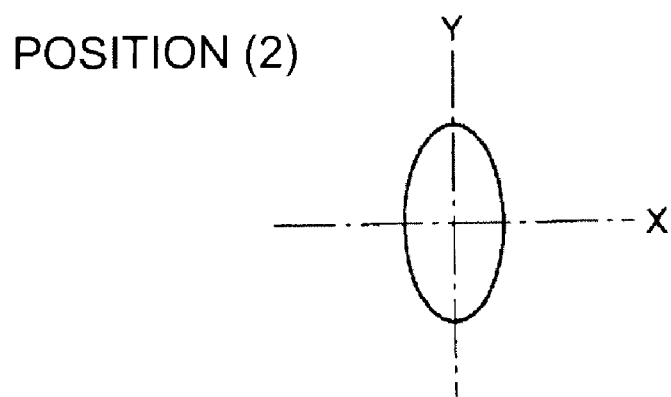

At the position (2) in the virtual plane 63b provided between the cylindrical lens 4 and the objective lens 6 of FIG. 1, when the light is observed immediately after the light emitted from the laser diode 1 passes through the cylindrical lens 4, the spot diameter of the light is narrowed only in the X-direction while elongated only in the Y-direction due to the feature of the cylindrical lens 4 as illustrated in FIG. 2B. As a result, the spot shape of the light becomes an elliptical shape.

Figure 2C:
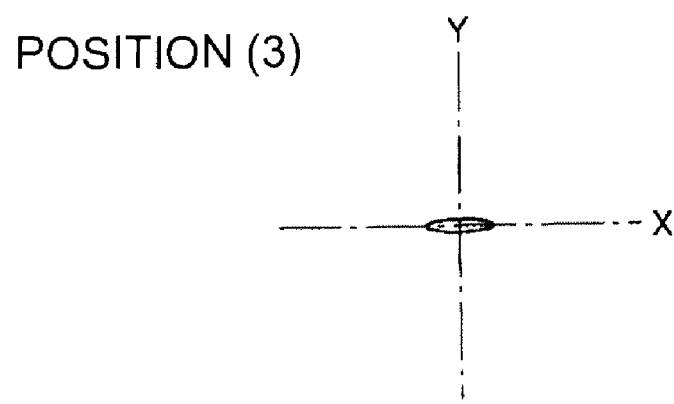

At the position (3) in the lower direction of the virtual plane 63d located in the surface of the measurement object 90 of FIG. 1, when the light emitted from the laser diode 1 to the surface of the measurement object 90 is observed, the light becomes as illustrated in FIG. 2C. Referring to FIG. 2C, the spot of the light with which the surface of the measurement object 90 is illuminated after the objective lens 6 collects the light through the cylindrical lens 4 becomes a substantially rectangular beam (hereinafter referred to as slit beam) 63 that is short in the Y-direction while being long in the X-direction.

Figure 3A:
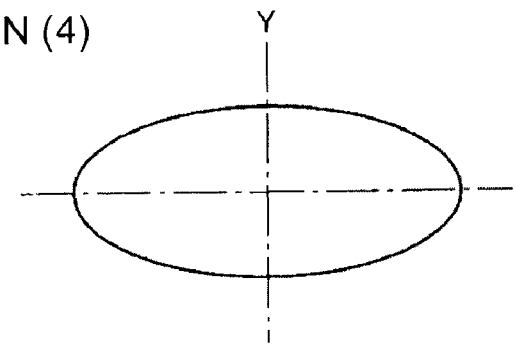
FIGS. 3A to 3C illustrate the light collecting state when a surface of a measurement object is a mirror surface in FIG. 1.
Figure 3B:
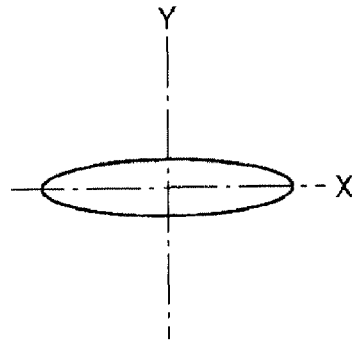
Figure 3C:
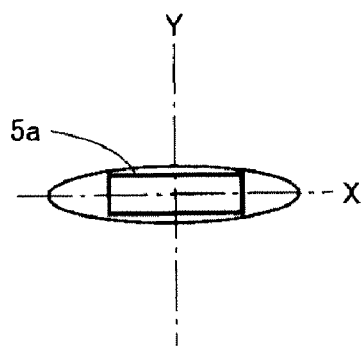
Figure 4A:
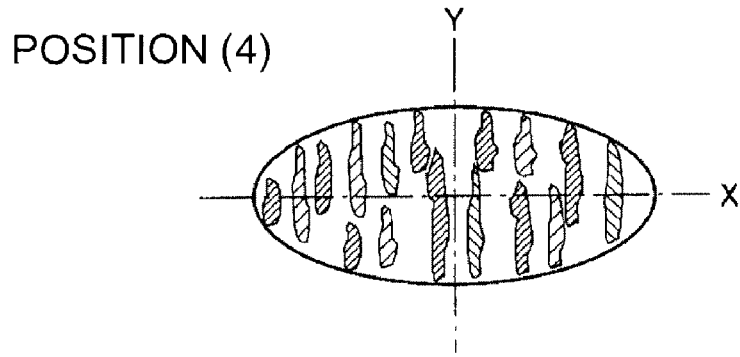
FIGS. 4A to 4C illustrate the light collecting state when the surface of the measurement object is a scattering surface in FIG. 1.
Figure 4B:
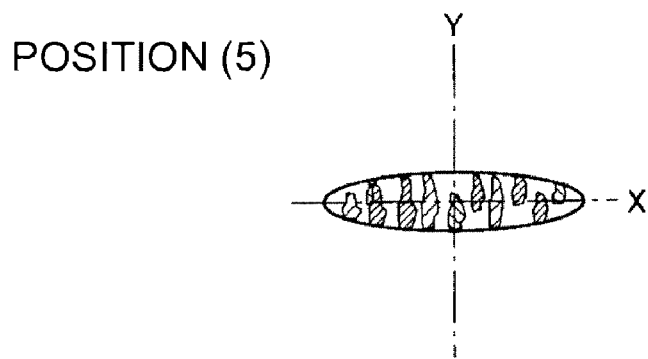
Figure 4C:
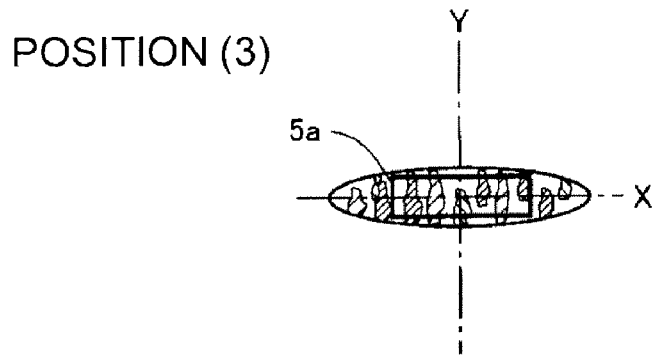

The collecting states of the light reflected from the surface of the measurement object 90 will be described for a mirror surface (FIGS. 3A to 3C) and a scattering surface (FIGS. 4A to 4C). At the position (4) of the virtual plane 63c, when the reflected light is observed immediately before the reflected light is incident to the objective lens 6, in the collecting shape of the reflected light, the slit beam 63 of FIG. 2C is diffused as illustrated in FIGS. 3A and 4A. At the position (5) of the virtual plane 63a, when the diffused reflected light is observed immediately after passing through the objective lens 6 and the cylindrical lens 4, the light spot has the slit shape that is short in the Y-direction while being long in the X-direction due to the passage of the light through the cylindrical lens 4 as illustrated in FIGS. 3B and 4B. Then the half mirror 3 collects the reflected light having the slit shape such that the reflected light contains the opening 5a on the diaphragm plate 5 (see FIGS. 3C and 4C).

The diaphragm plate 5 constituting the opening 5a is a light shielding member. The diaphragm plate 5 shields at least part of the light reflected from the surface of the measurement object 90. The light reflected from the surface of the measurement object 90 is separated by the half mirror 3 from an optical path of the light emitted from the laser diode 1. The opening 5a passes other parts of the reflected light to output the light onto the photodiode 2. As described above, because the confocal optical system of FIG. 1 is designed to be focused only in the Y-direction, the opening 5a has a rectangular slit shape in which a side in the Y-direction is shorter than a side in the X-direction as illustrated in FIGS. 3C and 4C in order to detect the confocal state in the Y-direction.

As described above, the cylindrical lens 4 corresponds to the spot diameter changing unit that changes the spot diameter of the laser beam with which the surface of the measurement object 90 is illuminated or the spot diameter of the laser beam reflected from the surface.

Referring to FIGS. 4A to 4C, the light reflected from the surface (scattering surface) of the measurement object 90 includes the speckles (not observed in the light reflected from the mirror surface) that are indicated by oblique lines. At this point, in the long axis direction that is of the X-direction, because the spot size is enlarged, the speckle size can be reduced. The spot size is reduced in the confocal direction that is of the Y-direction while the influence of the speckle is decreased, that is, measurement accuracy can be maintained while in-plane resolution can be enhanced in the measurement object surface.

Even if the surface state of the measurement object 90 is the scattering surface having the irregularity of the wavelength order of the laser diode 1, the influence of the speckle is averaged to be able to accurately measure the displacement. The average height value can accurately be measured in the measurement object surface by utilizing the slit beam 63, even if the surface of the measurement object 90 has the irregularity of the order exceeding the measurement resolution. It is not necessary to continuously move the spot position in the surface of the measurement object 90. Not the line sensor that is required to wait for the signal read time, but the photodiode is used to read the light receiving signal, so that the displacement can be measured at high speed.

In the first embodiment, the cylindrical lens is used as the spot diameter changing unit. Alternatively, other lenses, for example, a toric lens may be used as long as the focal distance in the X-direction differs from that in Y-direction.

Second Embodiment

Figure 5:
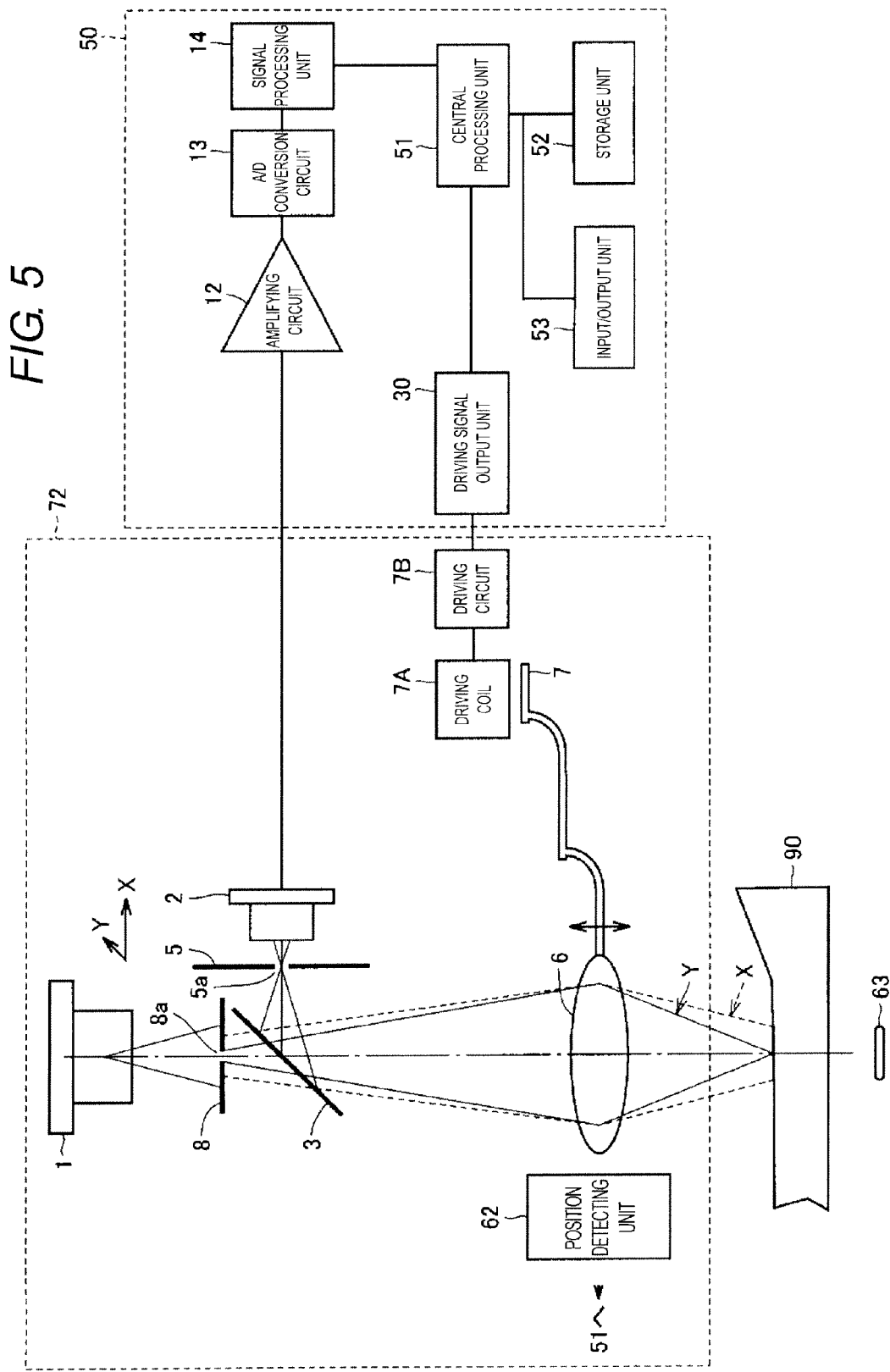
FIG. 5 schematically illustrates an entire configuration of a displacement sensor according to a second embodiment of the present invention.

FIG. 5 illustrates a schematic configuration of a displacement sensor according to a second embodiment of the present invention. The displacement sensor of FIG. 5 includes a sensor head 72 instead of the sensor head 71 of the displacement sensor of FIG. 1. The configuration of controller 50 is identical to that of FIG. 1.

In FIG. 5, the sensor head 72 includes a slit plate 8 instead of the cylindrical lens 4 of the sensor head 71 of FIG. 1, and the slit plate 8 constitutes part of the light collecting unit. A slit 8a that is of the opening portion is previously formed in the slit plate 8. The slit plate 8 is disposed on a light projecting optical path between the laser diode 1 and the half mirror 3 such that the optical axis passes through the opening of the slit 8a, and the laser beam from the laser diode 1 passes through the slit plate 8. The slit plate 8 is a light shielding member in which the slit 8a is formed. The light shielding member shields at least part of the light emitted from the laser diode 1, and the slit 8a passes other parts of the emitted light. Other configurations of the sensor head 72 are identical to those of the sensor head 71 of FIG. 1, and the description is omitted. The effect similar to that of the first embodiment is also obtained in the second embodiment.

Figure 6:
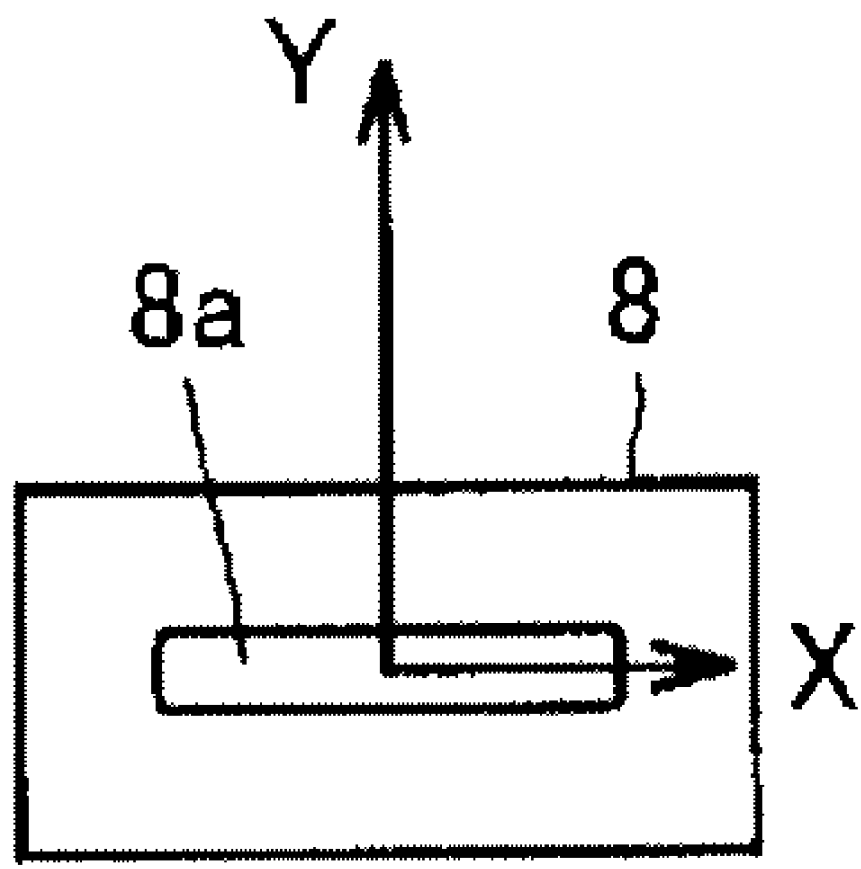
FIG. 6 illustrates a slit of the second embodiment of the present invention.

Referring to FIG. 6, the opening portion of the slit 8a of the slit plate 8 has the substantially rectangular shape in which the opening portion is long in the X-direction while being short in the Y-direction. The laser beam is emitted from the laser diode 1 so as to contain the slit 8a on the slit plate 8. Part of the emitted light is led to the objective lens 6 through the slit 8a.

In the second embodiment, the slit plate 8 in which the slit 8a is formed is used instead of the cylindrical lens 4 as the spot diameter changing unit, and the spot diameter changing unit shapes the slit beam 63 emitted from the laser diode 1 in the light collecting position on the surface of the measurement object 90 such that the slit beam 63 is long in the X-direction while being short in the Y-direction. The slit 8a formed in the slit plate 8 is not limited to the rectangular shape of FIG. 6, but any shape being long in the X-direction while being short in the Y-direction may be used as the shape of the slit 8a. For example, the slit 8a may have an elliptical shape.

Third Embodiment

Figure 7:
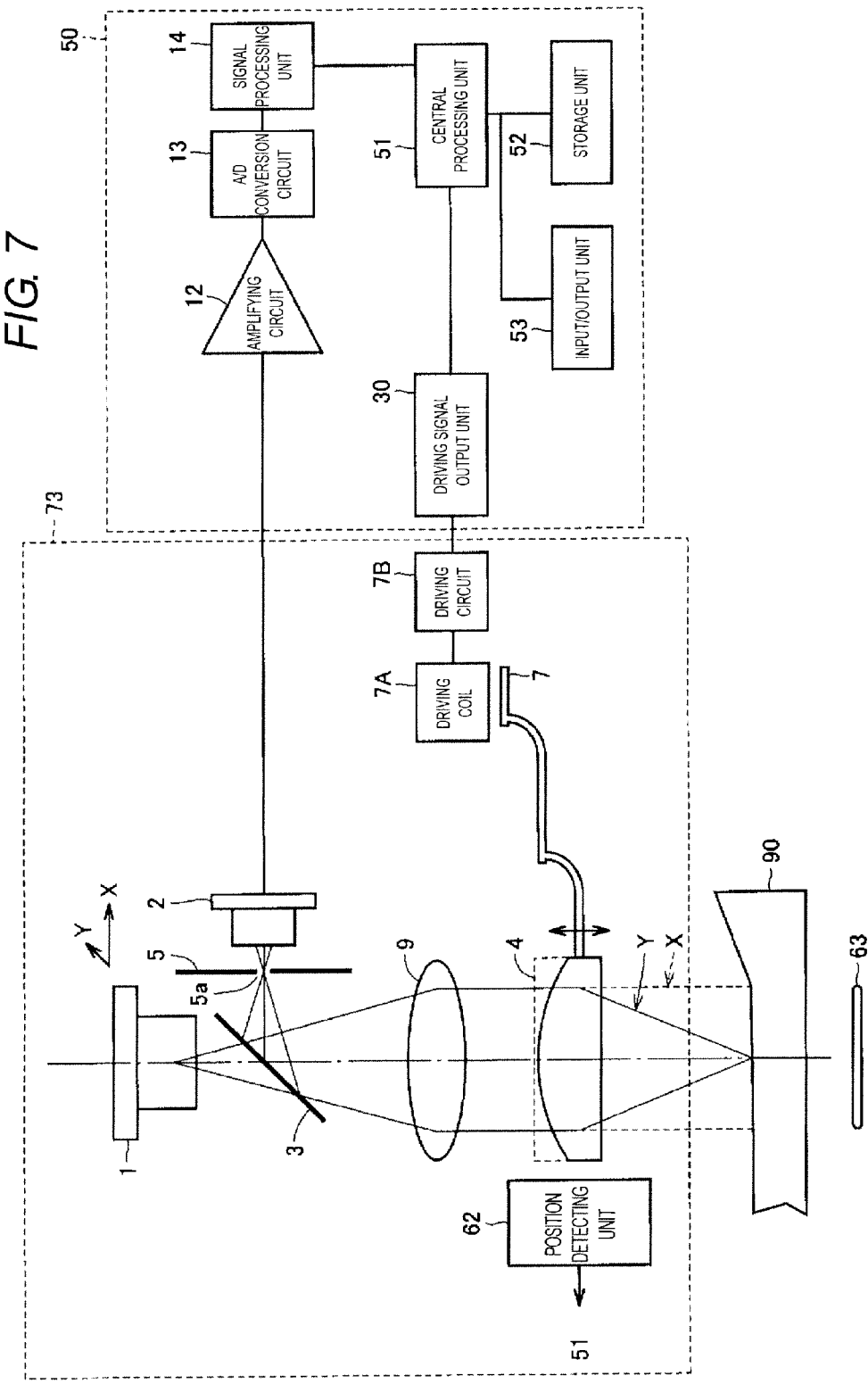
FIG. 7 schematically illustrates an entire configuration of a displacement sensor according to a third embodiment of the present invention.

FIG. 7 illustrates a schematic configuration of a displacement sensor according to a third embodiment of the present invention. The configuration of the displacement sensor of FIG. 7 differs from that of FIG. 1 in that the displacement sensor of FIG. 7 includes a sensor head 73 instead of the sensor head 71. The configuration and function of the controller 50 of FIG. 7 are identical to those of FIG. 1, and the description is omitted. The effect similar to that of the first embodiment is also obtained in the third embodiment.

In the sensor head 73, after a collimator lens 9 constituting part of the light collecting unit converts the light emitted from the laser diode 1 into substantially parallel light, the parallel light is collected toward the surface of the measurement object 90 through the cylindrical lens 4 constituting part of the light collecting unit. Accordingly, the slit beam 63 detected in the surface of the measurement object 1 becomes the substantially rectangular shape that is long in the X-direction while being short in the Y-direction.

At this point, as with the objective lens 6, the cylindrical lens 4 has the function of collecting the light onto the surface of the measurement object 90. Accordingly, as with the objective lens 6 of FIG. 1, the cylindrical lens 4 is supported by the oscillator 7, and the cylindrical lens 4 is oscillated in the arrow direction (vertical direction) of FIG. 7 by the driving coil 7A. The position detecting unit 62 detects the lens position signal for indicating the oscillation position of the cylindrical lens 4, and the position detecting unit 62 supplies the lens position signal to the central processing unit 51.

The light reflected from the light collecting position on the surface of the measurement object 90 is received by the photodiode 2 through the cylindrical lens 4, the collimator lens 9, the half mirror 3, and the opening 5a of the diaphragm plate 5.

Figure 8:
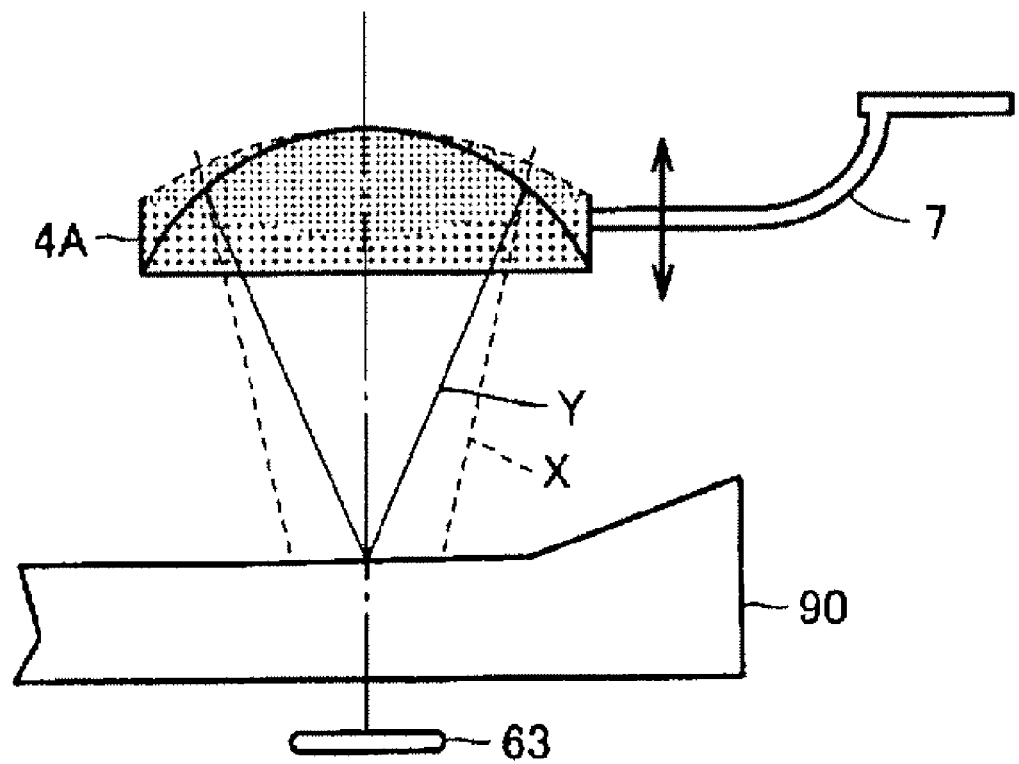
FIG. 8 illustrates a displacement sensor according to a modification of the third embodiment of the present invention.

In FIG. 7, because the slit beam 63 is long in the X-direction, a reflected light quantity, that is, a light quantity received by the photodiode 2 becomes smaller than that of the first and second embodiments. In order to increase the reflected light quantity, as illustrated in FIG. 8, the cylindrical lens 4 of FIG. 7 may be replaced with a toric lens 4A. For the cylindrical lens 4 of FIG. 7, the light is collected (narrowed) only in the Y-direction. However, in the toric lens 4A, the light can be collected not only in the Y-direction but also in the X-direction. Accordingly, when the toric lens 4A is used instead of the cylindrical lens 4, the slit beam 63 of FIG. 8 is shortened in the X-direction compared with the cylindrical lens 4 of FIG. 7, and the reflected light quantity, that is, the light quantity received by the photodiode 2 can be increased.

Fourth Embodiment

FIG. 9 illustrates a configuration of a displacement sensor according to a fourth embodiment of the present invention. The configuration of the displacement sensor of FIG. 9 differs from that of the displacement sensor of FIG. 1 in that the displacement sensor of FIG. 9 includes a sensor head 74 instead of the sensor head 71 of FIG. 1. The configuration and function of the controller 50 of FIG. 9 are identical to those of FIG. 1, and the description is omitted. The effect similar to that of the first embodiment is also obtained in the fourth embodiment.

The sensor head 74 differs from the sensor head 71 of FIG. 1 in that a position adjusting unit 41 is additionally provided in order to move (vertically move) the cylindrical lens 4 in the direction in which the optical axis extends. Other parts of the sensor head 74 are similar to those of the sensor head 71 of FIG. 1, and the description is omitted. The effect similar to that of the first embodiment is also obtained in the fourth embodiment.

Figure 10A:
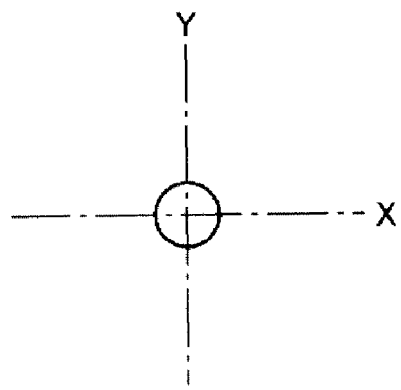
FIGS. 10A to 10C illustrate a light collecting state of FIG. 9.

The sensor head 74 of FIG. 9 includes the position adjusting unit 41, and the position adjusting unit 41 has a function of adjusting the position (vertical position) along the optical axis direction of the cylindrical lens 4 according to surface roughness (irregularity state) of the measurement object 90 or the necessary in-plane resolution. Because the cylindrical lens 4 can collect the light only in the Y-direction, the light collecting state becomes a substantially circular shape as illustrated in FIG. 10A when the light is observed at the position (5) of the virtual plane 63a in FIG. 9 immediately before the light emitted from the laser diode 1 is incident to the cylindrical lens 4.

Figure 10B:
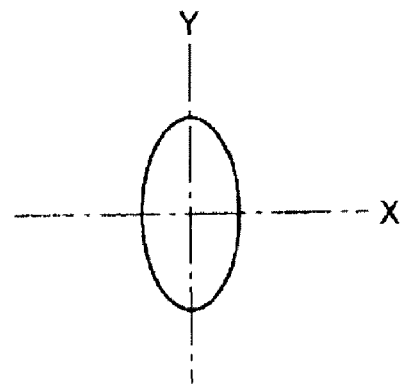

At the position (2) of the virtual plane 63b in FIG. 9, when the light is observed immediately before the light emitted from the laser diode 1 is incident to the objective lens 6 through the cylindrical lens 4, the light collecting state of FIG. 10B is observed. In FIG. 10B, the spot size is enlarged in the Y-direction because the light passes through the cylindrical lens 4.

Figure 10C:
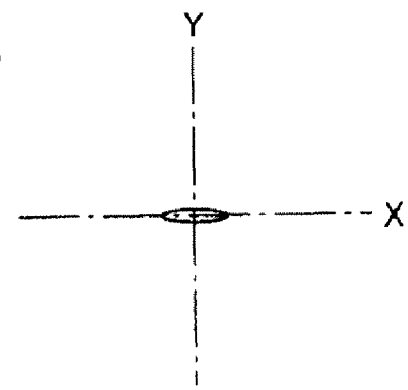

When the collecting state of the light with which the surface of the measurement object 90 is illuminated is observed at the position (3) of the virtual plane 63d in FIG. 9, the substantially rectangular laser spot 63 that is long in the X-direction while being short in the Y-direction (narrowed only in the Y-direction) is observed as illustrated in FIG. 10C.

Figure 11A:
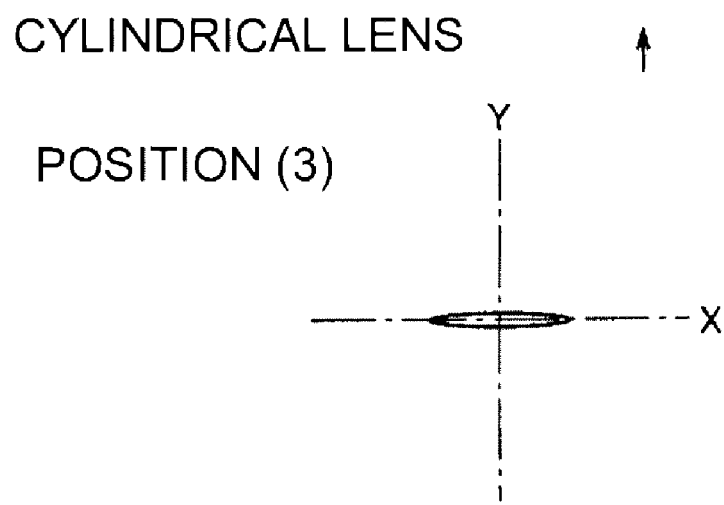
FIGS. 11A and 11B illustrate the light collecting state when a cylindrical lens is vertically moved in FIG. 9.
Figure 11B:
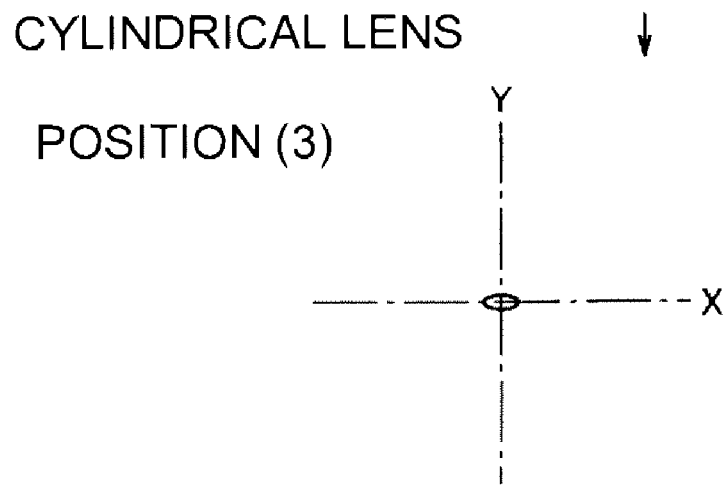

When the position of the cylindrical lens 4 indicating the light collecting state of FIG. 10C is raised toward the direction of the laser diode 1 by the position adjusting unit 41, the diameter of the slit beam 63 observed at the position (3) is changed into the shape in which the diameter extends in the X-direction while being not changed in the Y-direction as illustrated in FIG. 11A. On the other hand, when the position of the cylindrical lens 4 is lowered toward the direction of the measurement object 90, the diameter of the slit beam 63 observed at the position (3) is changed into the shape in which the diameter is shortened in the X-direction while being not changed in the Y-direction as illustrated in FIG. 11B.

Accordingly, when the measurement accuracy is further enhanced while the influence of the speckle caused by the surface roughness of the measurement object 90 is averaged, it is necessary that the current position of the cylindrical lens 4 be raised by the position adjusting unit 41. When the in-plane resolution is further enhanced, it is necessary that the current position of the cylindrical lens 4 be lowered by the position adjusting unit 41 as illustrated in FIG. 11B.

A configuration of the position adjusting unit 41 will be described with reference to FIGS. 12A and 12B. FIG. 12A illustrates a configuration of the position adjusting unit 41 when the position adjusting unit 41 is viewed from the Y-direction of FIG. 9, and FIG. 12B illustrates a section taken on a line XIIB-XIIB of FIG. 12A. The position adjusting unit 41 is supported by a support member 413 in order to vertically move the cylindrical lens 4 along the optical axis. A guide 412 penetrates through the support member 413, and the guide 412 guides the support member 413 that retains the cylindrical lens 4 in order to vertically move the support member 413 along the optical axis. A convex-concave portion 414 is integrally attached to the support member 413, and a spiral convex-concave member 417 is integrally attached to a rotatably supported shaft 411. The convex-concave portion 414 and the convex-concave member 417 are engaged with each other. When the shaft 411 rotates in a direction of an arrow 415 of FIG. 12A, the convex-concave member 417 integrally provided in the shaft 411 rotates on a spiral trajectory, and the convex-concave portion 414 engaged with the convex-concave member 417 is moved in a direction of an arrow 416 of FIG. 12A in conjunction with the rotation of the convex-concave member 417. As a result, the cylindrical lens 4 retained by the support member 413 is raised in the direction of the arrow 416 of FIG. 12A. On the other hand, when the shaft 411 rotates in the opposite direction to the arrow 415, the support member 413 is lowered in the opposite direction to the arrow 416, that is, the direction of the measurement object 90 in conjunction with the rotation of the shaft 411, thereby lowering the cylindrical lens 4 retained by the support member 413.

The vertically moved optical lens is not limited to the cylindrical lens 4, but the optical lens may be a toric lens.

Fifth Embodiment

In FIG. 5, the size is fixed in the opening portion of the slit 8a previously formed in the slit plate 8. However, the size of the opening portion of the slit 8a may be variable in a fifth embodiment of the present invention.

FIG. 13 illustrates a schematic configuration of a displacement sensor of the fifth embodiment. The configuration of the displacement sensor of FIG. 13 differs from that of the displacement sensor of FIG. 5 in that the displacement sensor of FIG. 13 includes a sensor head 75 instead of the sensor head 72. The configuration and function of the controller 50 of FIG. 13 are identical to those of FIG. 1, and the description is omitted. The effect similar to that of the first embodiment is also obtained in the fifth embodiment.

The sensor head 75 differs from the sensor head 72 of FIG. 5 in that a slit width changing unit 82 is additionally provided in order to be able to change the size of the opening portion of the slit 8a. Other parts of the sensor head 75 are similar to those of the sensor head 72 of FIG. 5, the description is omitted.

Figure 14A:
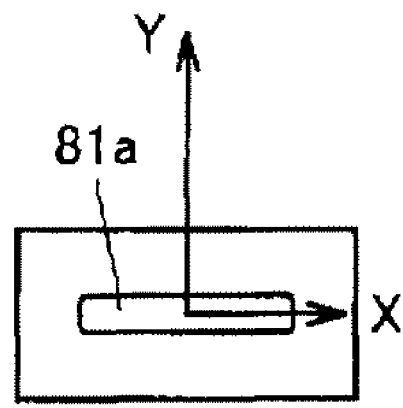
FIGS. 14A and 14B illustrate a slit of FIG. 13 and a light collecting state when the slit is used.
Figure 14B:
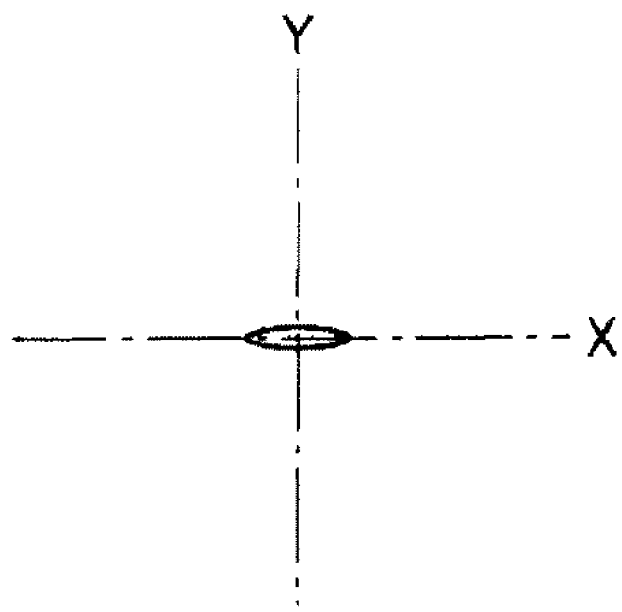
Figure 15A:
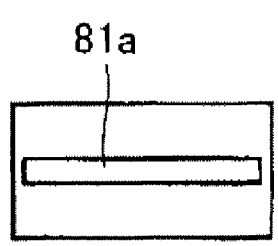
FIGS. 15A and 15B illustrate enlargement of the slit width of FIG. 13.
Figure 15B:
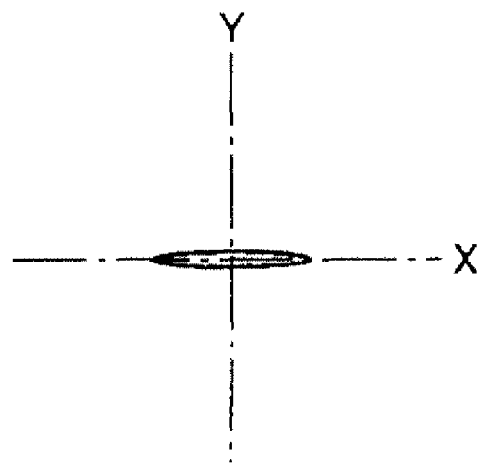
Figure 16A:
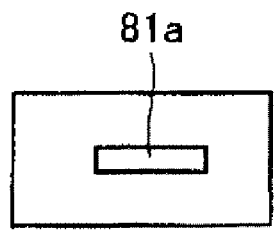
FIGS. 16A and 16B illustrate reduction of the slit width of FIG. 13.
Figure 16B:
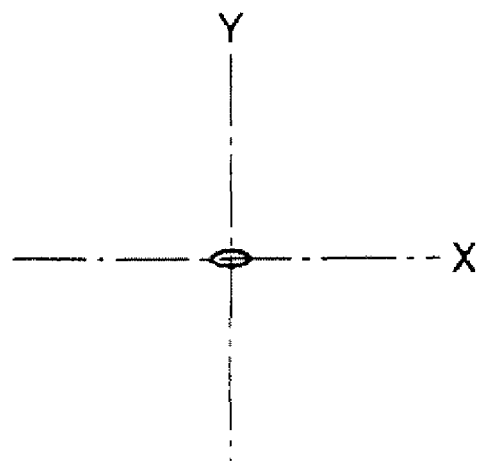

It is assumed that the slit beam 63 has a shape of FIG. 14B when the slit 81a whose slit width is variable has a size of FIG. 14A. When the width in the X-direction of the slit 81a is enlarged by the slit width changing unit 82 as illustrated in FIG. 15A, the diameter of the slit beam 63 is lengthened in the X-direction as illustrated in FIG. 15B. On the other hand, when the width is reduced as illustrated in FIG. 16A, the diameter of the slit beam 63 is shortened in the X-direction as illustrated in FIG. 16B.

A configuration of the slit width changing unit 82 will be described with reference to FIGS. 17A and 18B. FIG. 17A illustrates a configuration of the slit width changing unit 82 when the slit width changing unit 82 is viewed from the objective lens side of FIG. 13, and FIG. 17B illustrates a section taken on a line XVIIB-XVIIB of FIG. 17A. In the slit width changing unit 82, two plates 824 that can be moved in the X-direction are supported by support members 822 such that part of the slit 81a is covered with the plates 824. The support members 822 act as a guide that guides the two plates 824 so as to slide the plates 824 in the X-direction. Convex-concave portions 823 are integrally attached to the two plates 824, respectively. Spiral convex-concave members 827a and 827b are integrally attached to rotatably supported shafts 821, respectively. The convex-concave portions 823 and the convex-concave members 827a and 827b are engaged with each other. When the shaft 821 rotates in a direction of an arrow 825 of FIG. 17A, the convex-concave members 827a and 827b integrally provided in the shaft 821 rotate in the opposite directions to each other on spiral trajectories, and the convex-concave portions 823 engaged with the convex-concave members 827a and 827b are moved in directions of arrows 826 of FIG. 17A in conjunction with the rotations of the convex-concave members 827a and 827b. As a result, the two plates 824 retained by the support member 822 are moved in the directions of the arrows 826 of FIG. 17A to reduce the width in the X-direction of the slit 81a. On the other hand, when the shaft 821 rotates in the opposite direction to the arrow 825, the two plates 824 are moved in the opposite direction to the arrow 826 in conjunction with the rotation of the shaft 821, thereby enlarging the width in the X-direction of the slit 81a.

Accordingly, when the measurement accuracy is further enhanced while the influence of the speckle caused by the surface roughness of the measurement object 90 is averaged, it is necessary that the width in the X-direction of the slit 81a be enlarged by the slit width changing unit 82. When the in-plane resolution is further enhanced, it is necessary that the width in the X-direction of the slit 81a be reduced by the position adjusting unit 41 such that the reflected light quantity (light quantity received by the photodiode 2) becomes sufficient.

The disclosed embodiments are described only by way of example, and it is noted that the present invention is not limited to the embodiments. The scope of the present invention is expressed by not the description but claims of the present invention, and the scope of the present invention includes meanings equivalent to claims and all modifications within a range of claims.

What is claimed is:

1. A displacement sensor comprising:
a light source that emits light;
a light projecting unit that projects the light emitted from the light source toward a measurement object to illuminate the measurement object with the light while continuously changing a light collecting position along an optical axis direction of the light to be collected;
a light collecting unit that guides reflected light of the light with which the measurement object is illuminated in an opposite direction to an optical path of the illumination light of the light projecting unit;
an optical path separating element that separates an optical path of the reflected light in the light collecting unit from the optical path of the light projecting unit;
a first opening portion that includes a first light shielding member constituting a first opening, the first light shielding member shielding at least part of the reflected light separated from the optical path of the light projecting unit by the optical path separating element while the first opening passes other parts of the reflected light;
a light receiving unit that receives the reflected light passed through the first opening portion and supplies a light receiving signal according to a received light quantity; and
a processing unit that obtains information on a distance to the measurement object based on the light receiving signal,
wherein the light collecting unit includes a spot diameter changing unit that outputs the light to the measurement object while changing a diameter in a direction, in which a first axis orthogonal to the optical axis extends, shorter than a diameter in a direction, in which a second axis orthogonal to the optical axis extends, of a spot in the light collecting position on the measurement object, the spot on the measurement object is focused in the direction in which the first axis extends, the first opening having a substantially rectangular shape is disposed in a position of conjugation with the light source in the direction in which the first axis extends, and a side in the direction in which the first axis extends of the substantially rectangular shape is shorter than a side in the direction in which the second axis extends.

2. The displacement sensor according to claim 1, wherein the spot diameter changing unit includes an optical lens whose principal axis is matched with the optical axis, and in the optical lens, a focal distance in the direction in which the first axis extends differs from a focal distance in the direction in which the second axis extends.

3. The displacement sensor according to claim 2, wherein the optical lens is movable along the optical axis direction.

4. The displacement sensor according to claim 2 or 3, wherein the optical lens is a cylindrical lens.

5. The displacement sensor according to claim 2 or 3, wherein the optical lens is a toric lens.

6. The displacement sensor according to claim 1, wherein the spot diameter changing unit includes a second light shielding member constituting a second opening, the second light shielding member shields at least part of the illumination light, the second opening includes a second opening portion that passes other parts of the illumination light, the second opening has a rectangular shape, and a side in the direction in which the first axis extends of the rectangular shape is shorter than a side in the direction in which the second axis extends.

7. The displacement sensor according to claim 2, wherein a length of a side is variable in a direction in which the second axis of the second opening extends.

* * * * *